Figure 1:
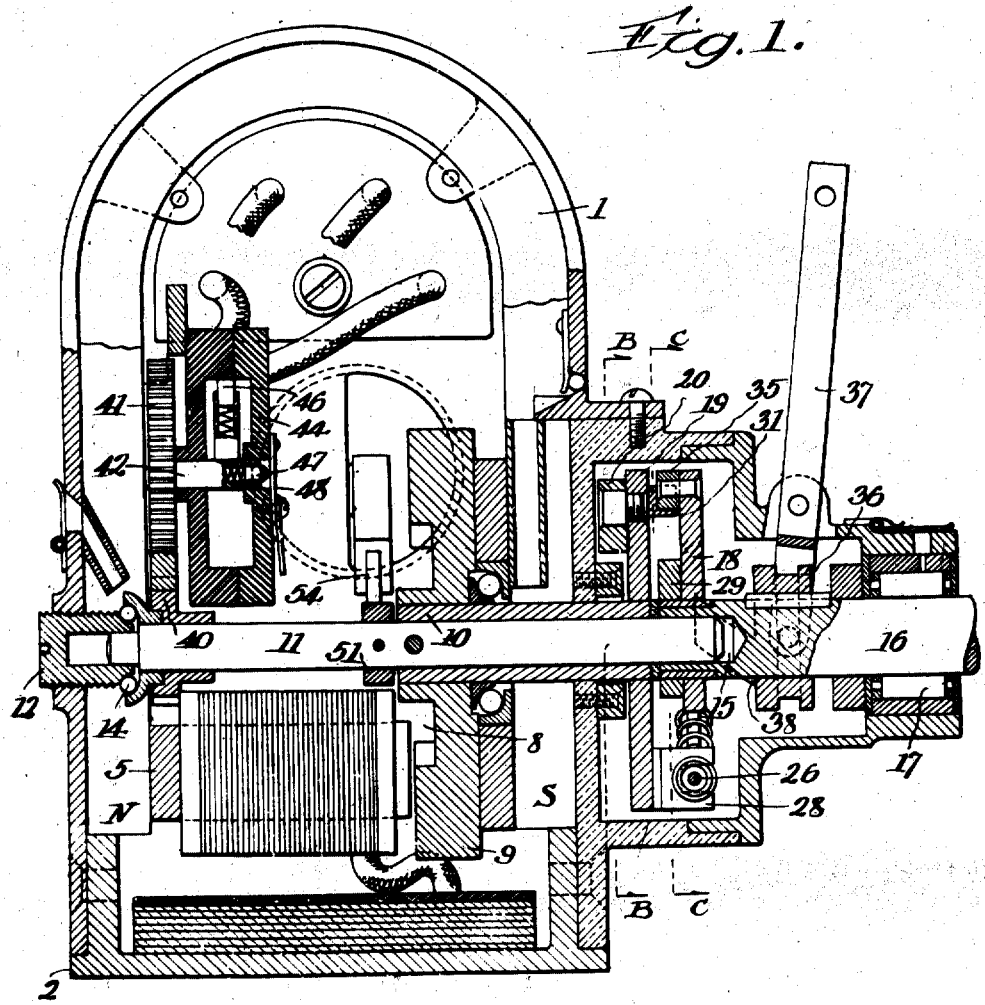

J. CARTER.
GENERATOR FOR INTERMITTENT ELECTRIC CURRENTS.
APPLICATION FILED MAR. 1, 1916.

1,231,126.

Patented June 26, 1917.
3 SHEETS—SHEET 1.

Witness:

Inventor
Jonas Carter
by Baldwin & Wight
his Attys.

J. CARTER.
GENERATOR FOR INTERMITTENT ELECTRIC CURRENTS.
APPLICATION FILED MAR. 1, 1916.
1,231,126.                    Patented June 26, 1917.
3 SHEETS—SHEET 3.
Fig. 3.            Fig. 4.
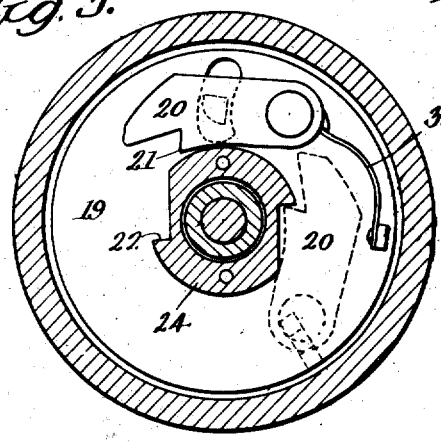
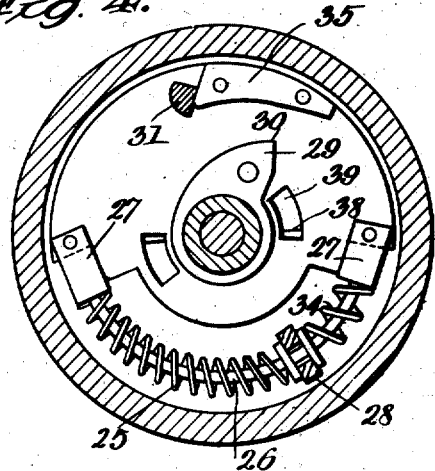
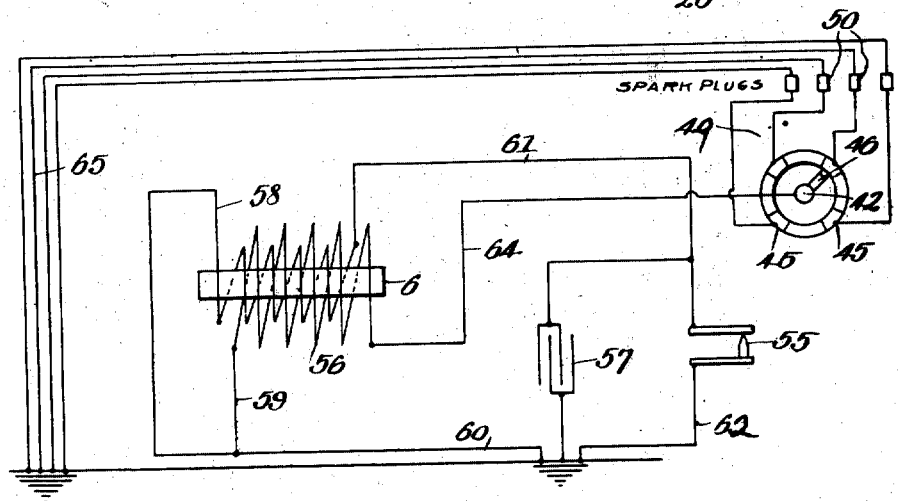
Fig. 5.            Fig. 6.
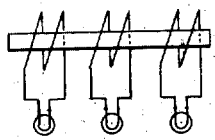
Witness:                    Inventor
                            Jonas Carter,
                        by Baldwin & Wight
                            his Attys.

UNITED STATES PATENT OFFICE.

JONAS CARTER, OF WAUKEGAN, ILLINOIS, ASSIGNOR TO CARTER-LONG MAGNETO COMPANY, OF WAUKEGAN, ILLINOIS, A CORPORATION OF ILLINOIS.

GENERATOR FOR INTERMITTENT ELECTRIC CURRENTS.

1,231,126. Specification of Letters Patent. Patented June 26, 1917.

Application filed March 1, 1916. Serial No. 81,430.

*To all whom it may concern:*

Be it known that I, JONAS CARTER, a citizen of the United States, and a resident of the city of Waukegan, in the county of Lake, State of Illinois, have invented certain new and useful Improvements in Generators for Intermittent Electric Currents, of which the following is a specification.

This invention relates to electric current generators of the type in which stationary permanent field magnets carrying coils of wire are employed in connection with an inductor or armature which is so operated as to induce intermittent currents in the coils connected with the field magnets.

The object of this invention is to produce a device of the character described, for use more particularly with internal combustion engines, in which the magnetic lines of force through the stationary core about which the coil is wound may be cut as suddenly as possible irrespective of the speed of the engine driving the same, thereby producing a correspondingly sudden increase in potential in the coil and resultant maximum sparking efficiency, whereby the necessity of employing batteries for use in starting the engine is eliminated.

Another object of my invention is to provide means whereby when the speed of the driving means reaches a predetermined point the generator will be positively connected therewith.

Another object of the invention is the provision of a secondary core having a winding thereon in which current may be induced for use in connection with electric lamps or spark coils.

Other and further objects of the present invention will in part be obvious and will in part be pointed out in the specification hereinafter following, and by reference to the drawings forming a part thereof, in which like reference characters have been used to indicate like parts throughout the several views thereof.

Figure 2:
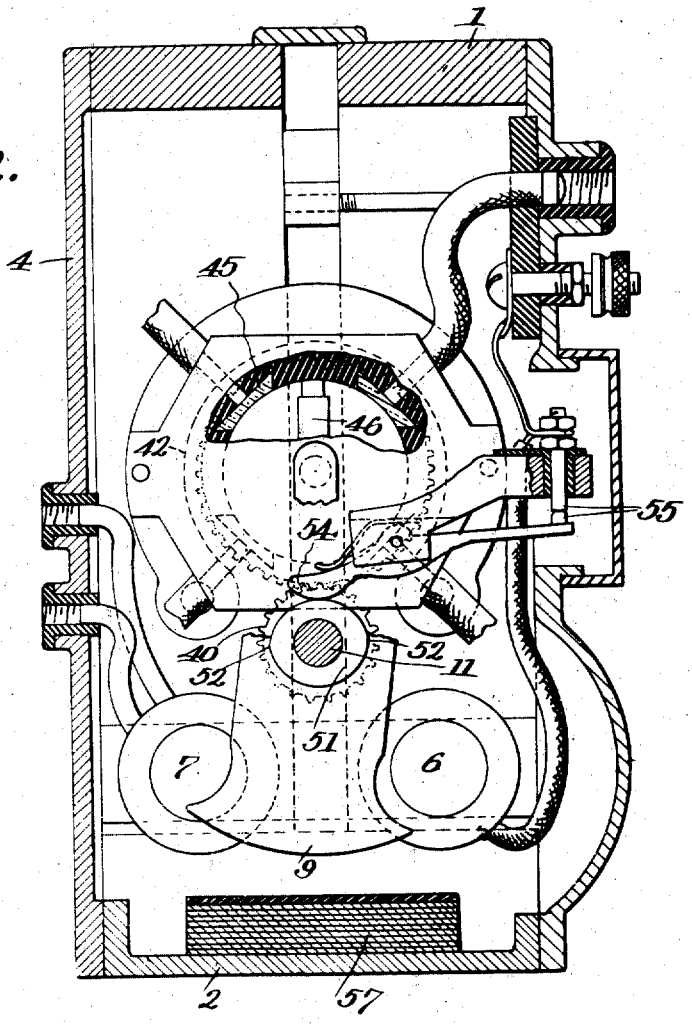

Figure 1 is a longitudinal cross-sectional view of the improved generator. Fig. 2 is a detail view showing certain parts in section. Fig. 3 is a cross-sectional view on the line B—B of Fig. 1. Fig. 4 is a cross-sectional view on the line C—C of Fig. 1. Fig. 5 is a wiring diagram of the high tension system. Fig. 6 is a wiring diagram of the low tension system.

With some of the generators heretofore used for producing the igniting spark for internal combustion engines it has been necessary to employ an auxiliary coil for use in starting the engine for the reason that the initial speed produced in the generator by cranking the engine was insufficient to generate a sufficiently hot spark for ignition purposes. With the construction herein shown, this objection is entirely overcome, and by means of my improved clutch I am enabled to produce a sufficiently hot spark at all times, irrespective of the speed of the engine, for successfully igniting the charge of explosive mixture within the engine.

Referring now more particularly to the drawings, the improved generator comprises any number of permanent horse-shoe magnets 1 suitably mounted on a base 2 of brass or other non-conducting material. The magnets are inclosed within a suitable casing 4 some of the details of which will hereinafter be more particularly referred to. A duplex core or pole piece 5 of soft iron is attached to one of the poles N of the magnets, one member 6 of the duplex core carrying primary and secondary windings of suitably insulated wire in which are induced the currents employed for ignition purposes. The other member 7 of the core is disposed parallel with the member first referred to and carries a primary winding in which currents are induced, by the cutting of the magnetic lines of force, for use with the electric lamps or other suitable devices requiring a low tension current. Both of the core members 6 and 7 project toward the opposite poles S of the field magnets, but terminate a short distance therefrom, thereby providing a space 8 between the ends of the members and the field magnets in which the inductor or armature 9 is adapted to rotate. The armature 9 is preferably made of soft iron and is mounted on a sleeve 10 carried by the shaft 11, which may be made of bronze or like material. One end of the shaft 11 is mounted in an adjustable journal 12 carried in the casing 4, and is preferably provided with suitable antifriction bearings 14. The opposite end of the shaft 11 is mounted loosely within a recess 15 in the driving shaft 16, which is suitably journaled in the bearings 17.

For forming a driving connection between the shafts 16 and 11 there is preferably provided a disk 18 on the shaft 16, and a second disk 19 on the shaft 11. The second disk 19 carries on one side thereof a pivotally mounted dog 20 the nose 21 of which is adapted to engage the shoulders 22 on the plate 24 carried by the casing. The dog being in engagement with the shoulder of the plate as just described, motion from the driving shaft is transmitted to the disk 19 through the spring 25 carried on the guide rod 26, the opposite ends of which are securely fastened in blocks 27 mounted on the disk 18. Continued rotation of the shaft compresses the spring 25 between one of the blocks 27 and the follower 28 of the disk 19. Such compression continues until the cam 29 has rotated a sufficient distance for the point 30 to engage the projection 31 on the dog 20. This lifts the dog 20 against the action of the spring 32 out of engagement with the shoulders 22 of the plate 24, whereupon the tendency of the spring 25 to expand rapidly rotates the disk 19 and its associated parts in a clockwise direction, the movement in this direction being checked by the buffer spring 34 mounted on the guide rod 26 on the opposite side of the follower 28. At this time the dog again engages one of the shoulders of the plate and the action is repeated, it being apparent by reference more particularly to Fig. 3 of the drawings that this action occurs twice for each revolution of the driving shaft. As soon as the speed of the rotation reaches a predetermined point, the dog is thrown by centrifugal action into its outward position, in which position the projection 31 comes into engagement with the stop 35 on the disk 18, and the parts are positively connected together causing both portions of the shaft, together with their associated parts to rotate in synchronism.

It is frequently desirable to either advance or retard the spark, and for producing such adjustment there may be provided a collar 36 slidably mounted on the driving shaft 16 and controlled by means of a bifurcated lever 37 pivoted in any desired manner to the shaft casing. This collar 36 carries on one side thereof inclined actuating members 38, the ends of which engage the openings 39 of the disk 18 as clearly shown in Fig. 4. It will be apparent that upon sliding the collar longitudinally the disk 18 may be turned relatively to the shaft 16, such adjustment causing the point of the cam 29 to engage the projection 31 either at an earlier or later time in the cycle of operations of the device as desired.

On the opposite end of the shaft 11 is mounted a fiber or bronze gear 40 meshing with the gear 41 mounted on the shaft 42 in a suitably constructed casing 44 of non-conductive material, said casing having peripherally disposed equi-distant contacts 45 adapted to be successively engaged by the brush 46 carried by the shaft 42 upon rotation of the same. The shaft 42 is preferably provided with a spring-pressed contact 47 in engagement with a stationary plate 48 to which current is supplied from the secondary winding about the member 6 of the core piece, as shown in Fig. 5, and the contacts 45 are each connected through the medium of a high tension cable 49 with the respective spark plugs of the engine cylinders.

When the armature 9 is between the end of the member 6 of the core and the poles S of the field magnets, nearly all of the magnetic lines of force pass from one pole of the field magnet to the other through the armature and the core 6, very few of the magnetic lines passing through the core piece 7 for the reason that in order to do so a large air gap or space 8 must be traversed. Thus the magnetism of the core 6 is gradually built up until the armature has passed from in front of the core 6 and assumes a position in front of the core 7. The reluctance, however, of the soft iron core to be de-magnetized delays any abrupt changes in the magnetic conditions of the core until slightly after the armature has passed away therefrom, at which time the circuit of the primary coil is broken by means of the cam 51 on the shaft 11. This cam is provided with two elevations 52 adapted to engage one end of the pivoted arm 54 to separate the contacts 55, thereby breaking the primary circuit and inducing a current of maximum potential. The continued rotation of the armature in a somewhat similar manner induces a current in the coil or coils 56 about the core piece 7, which current as heretofore described, is used for lighting or like purposes.

From the foregoing description it is believed that the mode of operation of my improved generator will be apparent. After properly adjusting the retarding or advancing member the engine is turned over thereby rotating the shaft 16. The initial rotation of the shaft 16 causes no movement of the armature for the reason that the same is positively prevented from rotation by reason of the engagement of the dog 20 with the stationary plate 24. As soon, however, as the dog is released from such engagement by the cam 29 the armature is rapidly rotated by means of the expansion of the spring 25, thereby cutting the lines of force in the shortest possible time and producing a potential of maximum efficiency.

In order to prevent excessive sparking upon breaking the primary circuit, there is preferably provided a condenser 57 shunted across the terminals of the circuit breaking device, as shown in Fig. 5. This condenser is preferably mounted in the base of the generator and entirely inclosed therein. The primary lead 58 having been connected with the secondary lead 59, both are grounded through the wire 60. The opposite end 61 of the primary is connected to one side of the circuit breaker which is in turn grounded through the shaft 11, or as shown in Fig. 5, by the wire 62. The lead 64 of the secondary winding is connected to the contact plate 48 from which plate the same is conducted by means of a contact 47, the brush 46, the contacts 45, and the high tension cables 49, to the spark plugs 50, which spark plugs are grounded through the engine casing, such grounded connection in Fig. 5 being represented by the wires 65, thus completing both primary and secondary circuits.

Having thus described my invention what I claim is:—

1. A generator for intermittent electric currents, comprising a permanent magnet having a duplex core piece attached to one pole thereof, wire coils on one member of said core, an armature adapted to rotate between the opposite pole of the magnet and the two members of the core, and means for rotating the armature, the axis of rotation of said armature being parallel to the axes of said core pieces.

2. A generator for intermittent electric currents, comprising a permanent magnet having a duplex core piece attached to one pole thereof, primary and secondary coils on one member of the core piece, primary coils on the other member of the core piece, an armature adapted to rotate between the opposite pole of the magnet and the two members of the core, and means for rotating the armature.

3. A generator for electric currents, comprising a permanent magnet, a casing for said magnet, a core piece mounted on one pole of the magnet, a shaft carrying an armature adapted to rotate between the opposite pole of the magnet and the core piece, a distributer within the casing, and means carried by the shaft for actuating said distributer.

4. A generator for electric currents, comprising a field magnet, a casing for said magnet, a core carried by one pole of the field magnet, a shaft having an armature adapted to rotate between the opposite pole of the magnet and the core piece, a distributer within the casing, means for actuating the distributer, a circuit breaking device, and means carried by the shaft for actuating said device.

5. A generator for electric currents, comprising a permanent field magnet, an armature shaft, a driving shaft, a disk mounted on each of the shafts and adapted to rotate therewith, and centrifugally operated means forming a positive driving connection between said disks, at high speeds, and intermittently checking the rotation of one of said disks at slow speeds.

6. In a generator for intermittent electric currents, an armature shaft, a driving shaft, a disk mounted on each of said shafts, means forming a resilient driving connection between said disks at predetermined times, and centrifugally operated means forming a positive driving connection between said disks at other times, said centrifugally operated means intermittently checking the rotation of one of said disks while said resilient means forms the driving connection.

7. A generator for intermittent electric currents, comprising a field magnet, a driving shaft, an armature shaft, a disk mounted for rotation with each of said shafts, a notched plate carried by the field magnet, a centrifugally operated dog for engagement with said plate at slow speeds, a projection on said dog, and means for engagement with said projection at high speeds.

8. A generator for intermittent electric currents, comprising a field magnet, an armature shaft, a driving shaft, a plate carried by said magnet, a disk on each of said shafts, a centrifugally operated dog carried by one of the disks and adapted to engage said plate at slow speeds, means carried by the other disk for engagement with said dog for releasing the same from engagement with the plate, a projection on said dog, and means carried by said last mentioned disk for engagement with said projection at high speeds.

9. In a generator for intermittent electric currents, a field magnet, an armature shaft, a driving shaft, a notched plate carried by said magnet, a disk carried by each of said shafts, a resilient driving connection between said disks, centrifugally operated means carried by one of the disks for engagement with the plate at slow speeds for temporarily preventing rotation of said disk and compressing said resilient driving connection, and means carried by the other of said disks for releasing said first mentioned disk.

10. In a generator for intermittent electric currents, a field magnet, an armature shaft, a driving shaft, a notched plate carried by said magnet, a disk carried by each of said shafts, a resilient driving connection between said disks, means carried by one of the disks for engagement with the plate for temporarily preventing rotation of said disk and compressing said resilient driving connection, and means carried by the other of said disks for releasing said first mentioned disk, said first mentioned means being centrifugally controlled and provided with means forming a positive driving connection when said armature shaft acquires a predetermined speed.

11. In a generator for intermittent electric currents, a field magnet, an armature shaft, a driving shaft, a notched plate carried by said magnet, a disk carried by each of said shafts, a resilient driving connection between said disks, means carried by one of the disks for engagement with the plate for temporarily preventing rotation of said disk and comprising said resilient driving connection, means carried by the other of said disks for releasing said first mentioned disk, said resilient driving connection rapidly rotating said armature shaft when said first mentioned disk is released, and centrifugally controlled means forming a positive driving connection when said armature shaft acquires a predetermined speed.

12. In a generator for electric currents, an armature shaft, a driving shaft therefor, a disk carried by each of said shafts, means forming a driving connection between said disks, and manually controlled means for moving one of said disks relative to the shaft for advancing or retarding the spark produced by said generator.

In testimony whereof, I have hereunto subscribed my name.

JONAS CARTER.

Witnesses:
HARVEY T. CRAWFORD,
AUGUST LONG.

Copies of this patent may be obtained for five cents each, by addressing the "Commissioner of Patents, Washington, D. C."